US007540027B2

(12) United States Patent
Achanta et al.

(10) Patent No.: US 7,540,027 B2
(45) Date of Patent: May 26, 2009

(54) METHOD/SYSTEM TO SPEED UP ANTIVIRUS SCANS USING A JOURNAL FILE SYSTEM

(75) Inventors: Phani Gopal V. Achanta, Austin, TX (US); Riaz Y. Hussain, Austin, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 11/165,447

(22) Filed: Jun. 23, 2005

(65) Prior Publication Data
US 2006/0294589 A1    Dec. 28, 2006

(51) Int. Cl.
*G06F 21/00* (2006.01)
(52) U.S. Cl. .......................................... 726/22; 726/24
(58) Field of Classification Search .................. 726/22, 726/24
See application file for complete search history.

(56) References Cited

U.S. PATENT DOCUMENTS

| | | | |
|---|---|---|---|
| 5,473,769 A | 12/1995 | Cozza | |
| 5,502,815 A | 3/1996 | Cozza | |
| 5,649,095 A | 7/1997 | Cozza | |
| 5,999,723 A | 12/1999 | Nachenberg | |
| 6,021,510 A | 2/2000 | Nachenberg | |
| 6,611,925 B1 | 8/2003 | Spear | |
| 6,714,951 B2 | 3/2004 | Bills et al. | |
| 6,735,700 B1 | 5/2004 | Flint et al. | |
| 6,763,466 B1 | 7/2004 | Glover | |
| 2002/0194212 A1 | 12/2002 | Grupe | |
| 2004/0068663 A1* | 4/2004 | Sobel | 713/200 |
| 2004/0117401 A1 | 6/2004 | Miyata et al. | |

* cited by examiner

*Primary Examiner*—Gilberto Barron, Jr.
*Assistant Examiner*—Devin Almeida
(74) *Attorney, Agent, or Firm*—Dillon & Yudell LLP

(57) ABSTRACT

A method and system that reduces the length of time required to complete antivirus scans. An enhanced journal file system (JFS) includes an antivirus utility function, which utilizes a low level log of the JFS to store a history of transactions that occur since a previous scan operation. The log is immune from normal purge operations by the JFS and cannot be circumvented without driver level access. Thus, a virus that changes the timestamp on the file or otherwise attempts to hide its viral activity does not affect the log. When the antivirus scanning utility initiates an antivirus scan of the system, the antivirus scanning utility obtains the history since the last scan from the persistent log. The antivirus scanning utility "replays" the log and carries out the antivirus scan on all files, directories, etc. associated with any transactions that occurred since the last scan.

3 Claims, 5 Drawing Sheets

| OBJECT TYPE 301 | NAME 303 | JOURNALING ATTRIBUTE 305 | 307 |
|---|---|---|---|
| FILE | FILE1 | YES | X |
| DIRECTORY | DIR1 | YES | |
| DIRECTORY | DIR3 | YES | |
| DATA LINK | DATA1 | | |
| ... | ... | ... | |
| DIRECTORY | DIR2 | YES | |

*Figure 3*

METHOD/SYSTEM TO SPEED UP ANTIVIRUS SCANS USING A JOURNAL FILE SYSTEM

BACKGROUND OF THE INVENTION

1. Technical Field

The present invention relates generally to computer systems and more specifically to protecting computer systems from malicious software. Still more particularly, the present invention relates to a method and system for efficiently scanning computer systems for malicious software.

2. Description of the Related Art

Many types of malicious software (e.g., virus, worms, spyware) exist in today's computing environment. These "malicious" or "hostile" software provide code designed or modified to intentionally corrupt or steal data or programs from the computer system or network on which it runs. Protecting from hostile code is a challenging problem, since there is no way to programmatically distinguish positive and negative program actions, other than knowing whether they are ultimately good for the user or not. For example, a program may delete a file because the user has explicitly asked it to, but a malicious program could also delete a file against the user's will. In other words, there is no proper technical definition of "malicious" or "hostile" code—these being defined according to the behavior expected from a computer by its legitimate user.

Although it is possible to authenticate authorized users with password, trusted users themselves may endanger the system and network's security by unknowingly running programs that contain malicious instructions such as "viruses," "Trojan horses," "malicious macros," "malicious scripts," "worms," "spying programs" and "backdoors." A computer virus is a program that replicates by attaching itself to other programs. A Trojan horse is a program that in a general way claims to do what the user expects it to do, but instead performs malicious actions such as data destruction, data dissemination and system corruption.

All of the above programs, and others not mentioned, can compromise computer systems and a company's confidentiality by corrupting data, propagating from one file to another, or sending confidential data to unauthorized persons, in spite of the user's will. To combat these attacks, various protection techniques (both hardware and software) have been put in place to protect the computer systems. For example, one hardware technique involves using the virtual memory support provided by most operating systems. This approach may involve mapping the entire database in a protected mode, and selectively un-protecting and re-protecting pages as they are updated. However, this mapping can be very expensive, for example, on standard UNIX systems.

Software techniques provide an alternative to the above hardware approach. Traditionally, the protection mechanisms focused solely on scanning the system for the presence of the malicious software. These scans were carried out after the malicious software had entered the base system and in some instances, after the corruption of the base system files had begun. Along that line of software protection, several different software have been developed to combat certain types of malicious software.

Virus signature scanners, for example, detect viruses by using a pre-defined list of "known viruses." They scan each file for each virus signature listed in their known virus database. Each time a new virus is found within the global computing community, the virus is added to that database. However, more and more new viruses are created every day, and these newer viruses are designed with more intelligent capabilities/functions to combat conventional virus scan techniques.

Antivirus scans typically take a lot of time to perform periodic scans (e.g., daily or weekly) of the entire filesystem. Even with simple filesystems, these antivirus scans may take anywhere from 30-90 minutes to complete. Various methods to reduce the amount of time required to complete antivirus scanning have been proposed. For example, U.S. Pat. No. 6,763,466 describes virus scanning where antivirus state information is stored within an associated data structure that is created or maintained by the filesystem of the computer. U.S. Pat. No. 5,502,815 describes a method for increasing the speed of detecting computer viruses by storing the initial state information of the file that has been examined for viruses, and then comparing the file's current state information to the initial state information to determine the level of scanning required. These methods assume that certain viruses change the state information of the file and that the change is detectable. Only the small subset of viruses that do not change the state information are checked against the file when the state information remains the same. Otherwise, the virus scan completes a scan of the entire system for all viruses. U.S. Pat. No. 5,473,769 describes a similar method by which the length (or other characteristic) of the file is checked to determine when a change has occurred within the file. This method assumes that a virus changes a pre-existing length of the file.

Various other methods have been proposed to speed up antivirus scanning. However, as shown in the examples below, none of these methods overcome the problems encountered with viruses developed with smarter anti-detection functionality. As an example, current optimizations involve storing a checksum of directories/files to know if a file has been touched since the last scan. However, these methods have the drawback that the checksum files can be compromised by a virus which is intelligent enough to know the data directory of the virus software. With antivirus systems that utilized/rely on a checksum, "smart" viruses have been developed that can infect/change the files and then reset the checksum to its correct value. Other types of current optimizations (for speeding up the virus scan) involve the user specifying a set of "safe" files not to be scanned. However, this method is inherently risky because the viral activity may be clever enough to disguise itself as a safe file.

The present invention thus recognizes that it would be desirable to reduce the length of time required to perform virus scans (or other similar file/system protection functions) while providing full protection of the computer system from malicious software.

SUMMARY OF THE INVENTION

Disclosed is a method and system that utilizes the functionality of journaling filesystems (JFS) to reduce the length of time required to complete antivirus software scans (or virus scans) on a computer system while ensuring protection against malicious software. The JFS designer/programmer enhances current JFS functions by adding a virus scanning support (VSS) utility. The VSS utility utilizes a low level log, referred to as a persistent antivirus transaction (PAT) log that is assigned by the JFS to store a history of changes since a previous virus scan operation. The designer/programmer further modifies the filesystem of the operating system (OS) to support restricted user-level access to the PAT log, and to make the log immune from normal purge operations by the JFS for completed operations. The history of operations involving data, files, and directories is maintained in the PAT log and cannot be circumvented without driver level access. A virus that changes the timestamp on a file or performs other similar methods to hide its viral activity does not affect the PAT log.

Following an initial virus scan of the entire computer system, all operations on the computer system are recorded within the PAT log. Before the antivirus scanning utility initiates a next virus scan of the system, the antivirus scanning utility obtains the history since the last scan from the PAT log. The antivirus scanning utility "replays" the log and completes the antivirus scan on only the files, data, and directories linked to any operations that occurred since the previous scan, i.e., the history of operations stored within the PAT log.

In one embodiment, the PAT log maintains a finite amount of data, i.e., the PAT log holds a preset limit/size. Once the log reaches the preset limit or a threshold value below the preset limit, the VSS utility (of the JFS) triggers the antivirus scanning utility to initiate a scan of the system, particularly the system files, data and directories identified within the PAT log. Once the antivirus scan is completed, the VSS utility (or JFS) resets the PAT log (i.e., deletes the replayed contents thereof that were subjected to the scan) and resumes logging new transactions as they occur.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 illustrates a transaction log of a journal filesystem (JFS), which may advantageously be utilized as a persistent antivirus transaction (PAT) log according to one embodiment of the invention;

DETAILED DESCRIPTION OF AN ILLUSTRATIVE EMBODIMENT

The present invention provides a method and system that utilizes the functionality of journaling filesystems (JFS) to reduce the length of time required to complete antivirus software scans (or virus scans) on a computer system while ensuring protection against malicious software. The JFS designer/programmer enhances current JFS functions by adding a virus scanning support (VSS) utility. The VSS utility utilizes a low level log, referred to as a persistent antivirus transaction (PAT) log that is assigned by the JFS to store a history of changes since a previous virus scan operation. The designer/programmer further modifies the filesystem of the operating system (OS) to support restricted user-level access to the PAT log, and to make the log immune from normal purge operations by the JFS for completed operations. The history of operations involving data, files, and directories is maintained in the PAT log and cannot be circumvented without driver level access. A virus that changes the timestamp on a file or performs other similar methods to hide its viral activity does not affect the PAT log.

Following an initial virus scan of the entire computer system, all operations on the computer system are recorded within the PAT log. Before the antivirus scanning utility initiates a next virus scan of the system, the antivirus scanning utility obtains the history since the last scan from the PAT log. The antivirus scanning utility "replays" the log and completes the antivirus scan on only the files, data, and directories linked to any operations that occurred since the previous scan, i.e., the history of operations stored within the PAT log.

A. Computer System Hardware/Software Overview

Figure 1:
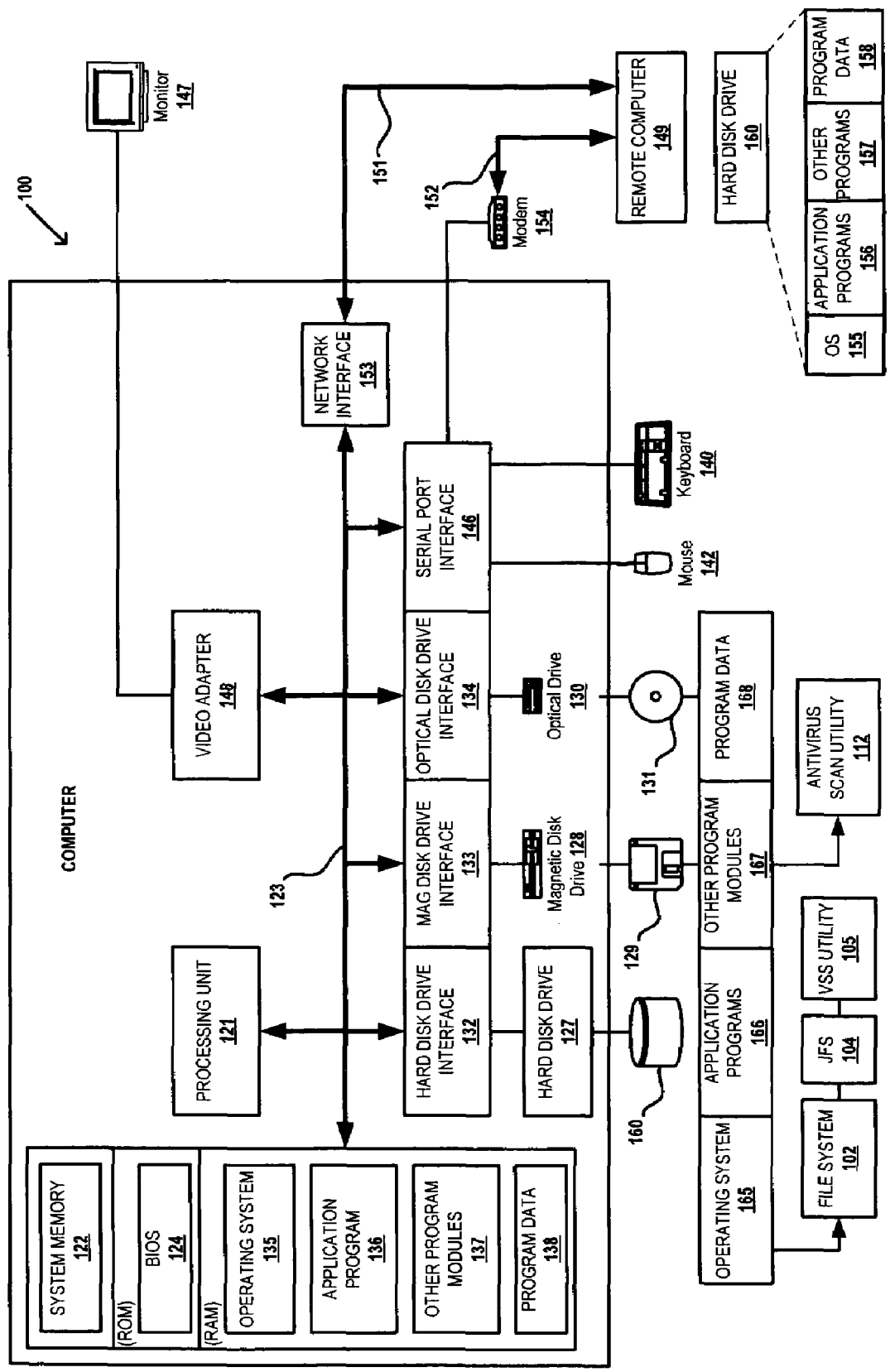
FIG. 1 is a block diagram of a computer system providing a hardware and software environment within which the various features of the invention may advantageously be implemented.

The invention is preferably implemented in a computer system, similar to computer system 100 illustrated by FIG. 1. The description of FIG. 1 is intended to provide a brief, general description of suitable computer hardware and a suitable computing environment within which the invention may be implemented. Although not required, the invention is described in the general context of computer-executable instructions, such as program modules, being executed by a computer, such as a personal computer. Generally, program modules include routines, programs, objects, components, and data structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With specific reference now to the figures, and in particular to FIG. 1, there is illustrated an exemplary computer system within which the functions of the invention may advantageously be implemented. Computer system 100 includes a processing unit 121, system memory 122, and system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, stored in ROM 124, contains the basic routines that help to transfer information between elements within the computer system 100 and recognize and configure device drivers for hardware devices, such as hard drives, etc., during boot-up of the computer system 100.

Computer system 100 further includes hard disk drive 127 for reading from and writing to hard disk 160, magnetic disk drive 128 for reading from or writing to removable magnetic disk 129, and optical disk drive 130 for reading from or writing to a removable optical disk 131 such as a CD ROM, DVD, or other optical media. Hard disk drive 127, magnetic disk drive 128, and optical disk drive 130 are connected to system bus 123 by hard disk drive interface 132, magnetic disk drive interface 133, and optical disk drive interface 134, respectively. The drives and their associated computer-readable media provide nonvolatile storage of computer readable instructions, data structures, program modules and other data. In the exemplary embodiment, the combination of computer readable instructions, data structures, program modules and other data on a single removable medium provides a system-wide skin with the functionality described herein.

Although the exemplary environment described herein employs hard disk 160, removable magnetic disk 129, and removable optical disk 131, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of base system level program modules are stored on the hard disk 160, ROM 124 or RAM 125 of the computer system. Among these are base operating system (OS) 135, one or more application programs 136, other program modules 137, and program data 138. In addition to these program modules, additional program modules may be provided on one or more of the memory devices (i.e., hard disk 160, magnetic disk 129, or optical disk 131). As illustrated, these program modules may also include operating system (OS) files 165, one or more application programs 166, other program modules 167, and program data 168. According to the illustrative embodiment, other program modules 137 or 167 include antivirus scan utility 112. However, antivirus scan utility 112 may be considered an application program 136/166 rather than other program module 137/167.

For purposes of illustration, base OS 106 is described as a Windows-based operating system, such as Windows XP®, which is a trademark of Microsoft Corp. The functions of the invention are, however, applicable to any operating system that supports the implementation of system-wide skins and related functionality, as described herein. Thus, for example, the invention may also be implemented within a Linux-based OS. Other OSes which may implement the functionality of the invention available include Hewlett Packard's HP-UX®, IBM's AIX®, Sun's Solaris®, etc.

In the illustrative embodiment, the OS 135/165 comprises a file system 102, a journal file system (JFS) 104, and a VSS utility 105. The OS 135/165 administers data storage of objects on a media storage device using the file system 102. The file system 102 allocates the storage of objects to files and directories. The JFS 104, in combination with the VSS utility 105, administers journaling of objects stored by the file system in one of two transaction logs, respectively. As illustrated, the file system 102, JFS 104 and VSS utility 105 are part of the OS 135/165. In alternate embodiments, however, VSS utility 105 may be a stand-alone program module included in the program modules 137/167. Further description of JFS and transaction logs, and other associated functionality are provided in section B below and illustrated in FIG. 2.

A user may enter commands and information into the computer system 100 through input devices such as keyboard 140 and graphical pointing device (mouse) 142. These input devices are often connected to CPU 121 through serial port interface 146 that is coupled to the system bus 123, but may be connected by other interfaces, such as a parallel port, game port or a universal serial bus (USB) or a network interface card. Monitor 147 or other type of display device is also connected to the system bus 123 via an interface, such as video adapter 148. In addition to monitor 147, computer system 100 may include other peripheral output devices, such as speakers and printers (not shown).

Computer system 100 may operate in a networked environment using logical connections to one or more remote computers, such as remote computer 149. Remote computer 149 may be another personal computer, a server, a router, a network PC, a peer device or other common network node. Depending on whether a wide area network (WAN) or local area network (LAN) (simply illustrated via connectors 152 and 151, respectively) is being accessed by computer system 100, the network access may be via modem 154 or network interface (or adapter) 153, respectively. The modem 154, which may be internal or external, is connected to the system bus 123 via the serial port interface 146. In a networked environment, program modules depicted relative to the personal computer 100, or portions thereof, may be stored in the remote memory storage device 160.

It is appreciated that the network connections shown are exemplary and other means of and communications devices for establishing a communications link between the computers may be used. In an exemplary networked environment, program modules providing antivirus functionality may be stored in the remote memory storage device and the VSS of the JFS linked across the network to the antivirus scan utility on the remote storage device. Thus, as illustrated, remote computer 149 also includes a hard disk 160 with operating system (OS) files 155, one or more application programs 156, other program modules 157, and program data 158.

Finally, while computer system 100 is illustrated with specific hardware and software components, the invention is applicable to any type of computer system configuration. It is understood that the above described embodiment is merely for illustration and not meant to imply any limitations on the actual structural design/configuration of the computer system in which the invention is practiced. Further, depending on implementation, it is understood that the functional features of the invention may be programmed into the system's OS or provided as a separate utility for enabling JFS functionality and/or antivirus scanning functionality.

B. Journal File System (JFS)

Journaling of objects within a filesystem is described in detail within U.S. Pat. No. 6,714,951, assigned to International Business Machines Corporation of Armonk N.Y., the assignee so the present invention. Applicant hereby incorporates by reference all relevant content of that patent. The present invention extends the journaling concept to antivirus arena to provide faster application of antivirus scanning of a file and system, as described below.

A storage device in a computer system stores the operating system software, user applications and data files. One function of the operating system is to administer data storage in the storage device. A sub-system of the operating system, namely the file system, administers data storage in the storage device by allocating data to files and directories in response to appropriate requests by a system user or by an application.

Over time, files and directories are modified in different manners. For example, directories are created and named. Files are generated and deleted, and the data in a file or in one of its attributes is modified. A link from a file or a directory to an existing directory or file may be added. To maintain a history of what activity has taken place within a digital storage device, a sub-system of the file system, namely the journal file system, keeps a current record, or journal, of directories and their contents.

A journal file system (JFS) is a file system in which the digital storage device maintains data integrity in the event of an operating system crash or if the operating system is otherwise halted abnormally. A JFS provides a facility to track detailed information about file system object changes and provides protection against partial changes being made to an object at the point of an abnormal system termination. An object, as used herein, is a named storage space in a file system, that consists of a set of characteristics that describe itself and in some cases data. Some examples of objects are directories, programs, files, libraries and folders.

The JFS maintains a journal (also known as a journal receiver) of what activity has taken place within the data area of the digital storage device, and if a system crash occurs, any lost data can be reconstructed from the information contained in the journal. FIG. 3 illustrates an exemplary journal log 300 that is a part of the JFS 156. In general, the journal log 300 comprises a plurality of journal records (i.e., each row of the table). Each journal record comprises a plurality of fields indicate by the headers object type 301, object name 303, and journaling attribute 305. Object type 301 is a descriptor used to indicate the type of object contained in the journal record. Examples of objects that may be contained in journal record are directory objects, file objects and data objects. Object name 303 is an arbitrary descriptor identifying the object with, for example, a unique ASCII designation. Other fields may be included in the journal record 300, such as fields specifying the length of the record, one or more recorded version numbers, a time stamp, the security descriptor assigned to the file, file attributes and the length in bytes of the name of the file. Journal record 300 is presented for illustration only, and those skilled in the art appreciate that many other record formats are suitable for achieving the functions provided herein.

In general, there are three primary areas of support from a JFS when an object is journaled. These areas of support are: (i) recording changes to objects, (ii) single system recovery, and (iii) recovery of a saved object to a known state. These areas are discussed below.

In a recording of changes to objects, object changes are recorded as journal entries in a journal receiver. The journal receiver is a file object that contains journal entries added by the operating system when files or directories are modified. As an example, directories are created and renamed or files are created and the data in a file or in one of its attributes has been modified. The journal entries may then be used for recovery from an abnormal system termination. Another use for the recorded changes is for replicating entries from the journal receiver to a back-up system so that they can be retrieved to create and maintain a replica of the source file system.

Single system recovery occurs during an initial program load (IPL) following an abnormal system termination. The journal receiver serves as a basis for all changes to objects that are implemented by an IPL. The IPL then processes object changes as if the abnormal system termination had not occurred by using the data contained in the receiver log that was created before the system termination. Damaged objects, caused by system functions that were interrupted during their critical operations, are discarded.

Recovery of a saved object to a known state is typically a system administrator-initiated recovery that provides a mechanism to recover a saved object to a specific state. The object is recovered to a state of its last saved operation occurring sometime prior to the operation that caused the object to become corrupted. A user initiated save command, though it could also be performed automatically by an application when the application is closed, typically performs a last saved operation. When an object is saved, a journal entry of the object is stored in the journal receiver.

In addition to the above three described areas of support, the present invention provides a fourth area of support, namely, application of journaling via a VSS and a PAT log to reduce antivirus scan times. These features are described in section C below.

C. JFS and Antivirus Scanning Via PAT Log

Figure 2:
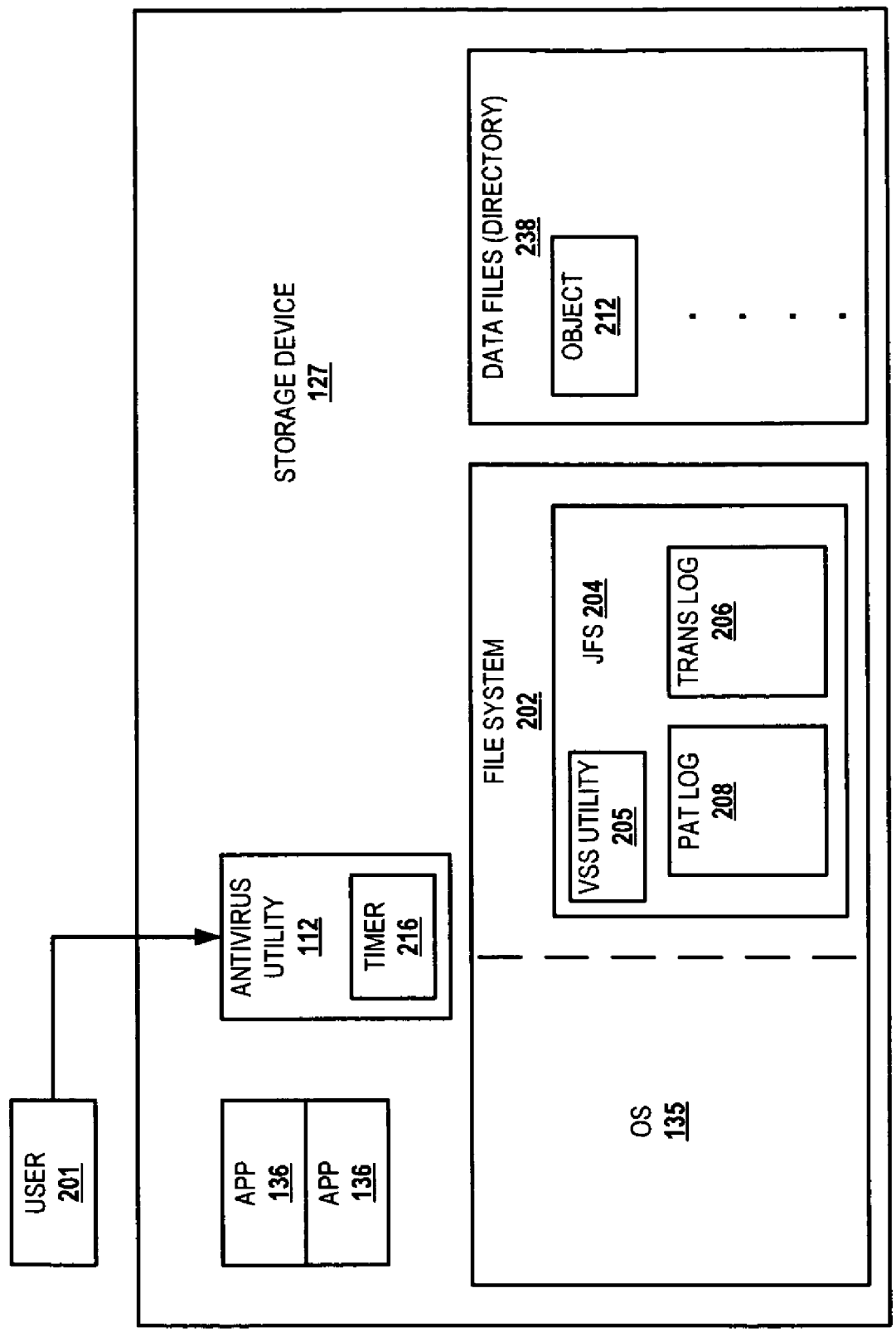
FIG. 2 is a block diagram representation of software components and utilities, which operate to reduce the length of time required for completing virus scans according to one illustrative embodiment of the invention.

FIG. 2 illustrates a block diagram representation of the various software components/utilities and transaction logs utilized to complete the functional features of the present invention. As previously described, JFS provides all standard JFS functions, but also provides a novel antivirus support function via a VSS utility and PAT log. Thus, as illustrated, filesystem 202 of OS 135 includes JFS 204, which in turn includes VSS utility 205 and two transaction logs. JFS 204 utilizes standard transaction log(s) 206, which records every change in filesystem, to enable a return to a stable/predictable state (in the event a recovery is required). Notably, JFS 204 discards these regular transaction logs once a write operation is completed.

JFS also provides a persistent antivirus transaction (PAT) log 208, which also records all changes in the filesystem. However, unlike the transaction log 206, PAT log 208 logs changes that occur between antivirus scans and maintains the recorded changes in a persistent manner for a pre-established period of time, until those changes are replayed by the antivirus scan utility 112. For simplicity in identifying this log and differentiating it from the other transaction logs, the invention refers to it as a PAT log, since PAT log 208 not only records all transactions that occurred over the pre-established time period, but also enables the virus scanning software to "replay" (or view) all transactions (including all viral activity) that occurred since the previous scan. In the illustrative embodiment, PAT log 208 is maintained in the filesystem. Because the filesystem is not exposed to user/application, JFS maintains the PAT log in a hidden state.

In another embodiment, rather than maintain two logs which simultaneously record the system's history (i.e., the same information/data recorded in both logs), the JFS provides a single (primary) log of the transaction history, and VSS utility provides a separate PAT log that is updated with the transaction history at the time when the primary log is ready to be purged. JFS provides a lazy copy mechanism that dumps the entries of the primary log into the PAT log at the time of purging the primary log. The PAT log is, however, not purged of its contents until the next virus scan operation completes.

As further illustrated by FIG. 2, antivirus scan utility 112 includes a timer (or counter) 216 that tracks the length of time between virus scans and activates a next virus scan when the pre-set time period between scans elapses. As described above, data files and changes thereto are stored within a directory 238 as individual objects 212 tracked by the JFS 204. Finally, a user is able to access the antivirus scan utility to initiate a scan operation, including over-riding the reduced scan feature provided by the invention for completion of a scan of the entire computer system.

Figure 4:
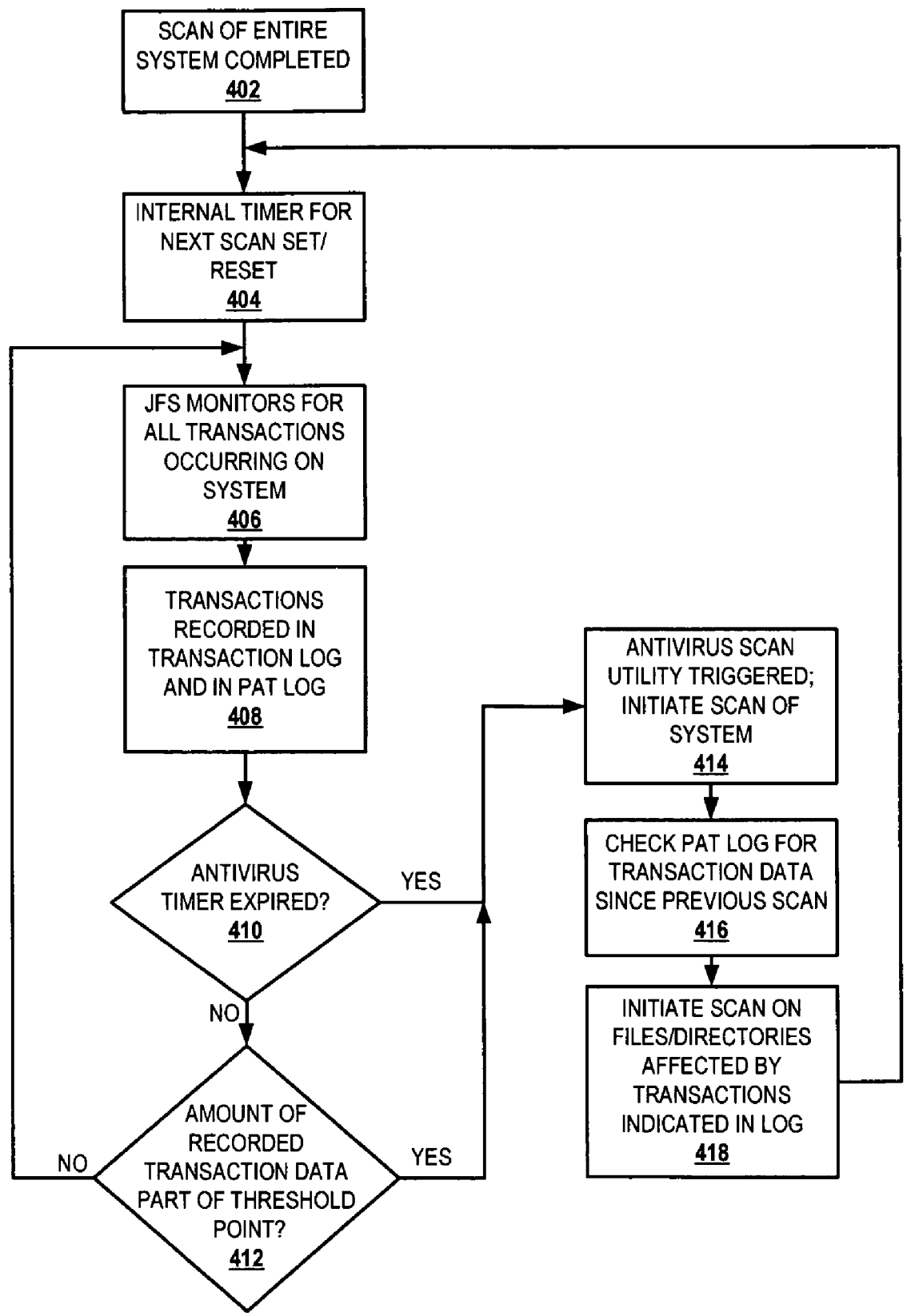
FIG. 4 is a flow chart of the overall operation of an antivirus scanning utility using the PAT log and features of the VSS utility according to one embodiment of the invention.

FIG. 4 provides a flow chart of the processes that occur in carrying out the reduced-time antivirus scanning functions of the invention. The process begins with an initial complete scan of the computer system, including all files, data and directories (folders), as shown at block 402. The antivirus scanning utility self-initiates this complete scan when the computer system is first powered on or when the computer system returns from a long period of inactivity. In one embodiment, the user of the computer system initiates the initial scan, and is able to force a complete scan of the entire computer system at any time by selection of that option within the graphical user interface (GUI) of the antivirus software utility (or virus scan utility). The antivirus software utility sets an internal timer (at block 404) that counts down the time until the antivirus software utility next completes a virus scan of the system. In one embodiment, the user sets the timer value, and the value set by the user becomes the default value, unless overridden by a trigger condition recorded by the VSS utility (or JFS), as described below.

While the virus scan is being completed, the JFS monitors for all/any transactions occurring on the computer system, as indicated at block 406. All transactions are recorded in both the transactions log (for system recovery purposes) as well as in the PAT log (for antivirus scanning purposes), as shown at block 408. A check is made at block 410 whether the timer of the antivirus software utility has expired, and if not, a second check is made at block 412 whether the amount of data within the PAT log has reached/surpassed a threshold point. If both checks produce negative results, JFS continues to log transactions in both the transaction log and the PAT log. When either the timer expires or the PAT log reaches the threshold point, the timer or the JFS triggers the antivirus scanning utility to begin a virus scan of the system, as shown at block 414.

When the antivirus scan utility receives either trigger, the utility activates a new scan process, which includes (1) first checking the PAT log for a list of data, files, and directories affected by any transactions since the previous scan (block 416) and then (2) initiating a virus scan on those data, files, and directories involved with the recorded transactions (block 418). The process is then repeated, as the JFS continues to monitor for transactions occurring on the system and placing them within both the transaction log and the PAT log, and the timer is reset and resumes counting down/up to the next scheduled virus scan.

In one embodiment, the PAT log maintains a finite amount of data, i.e., the PAT log holds a preset limit/size (e.g., 32 MB). Once the amount of recorded data within the PAT log reaches the preset limit or a threshold value below the preset limit, the VSS utility (of the JFS) triggers the antivirus scanning utility to initiate a scan of the system, particularly the system files, data and directories identified within the PAT log. Once the antivirus scan is completed, the VSS utility (or JFS) resets the PAT log (i.e., deletes the replayed contents thereof that were subjected to the scan) and resumes logging new transactions as they occur. As described below, another embodiment allows the PAT log to operate as a first-in first-out (FIFO) buffer, eliminating the need for contents of the PAT log to be deleted as the PAT log fills up.

In yet another embodiment, deletions within the filesystem are deferred until the virus san deems the system's data, files, and directories, safe (uncorrupted). Thus, prior to completing a purge of entries from the primary log, the JFS triggers the VSS utility to complete a virus scan of the data, files, directories associated with the entries within the VSS utility. In an alternate embodiment, JFS waits until the next scheduled virus scan is completed (i.e., no triggering of an early completion of a next virus scan occurs). If the virus scan finds an infected file, VSS (or the virus scan software) responds by checking for a deleted file of the same path in the recent history stored in the transactions log. When the deleted file is found in the transaction log, the VSS automatically replaces infected file with the deleted file. In an alternate implementation, VSS prompts the user whether to replace the infected file with the deleted file before such a replacement is made. Only after the virus scan is completed and a confirmation received that none of the data, files, or directories are infected (or confirmation that infected files have been cleaned or replaced with a deleted file from the transactions log), does JFS purge the data file.

Figure 5:
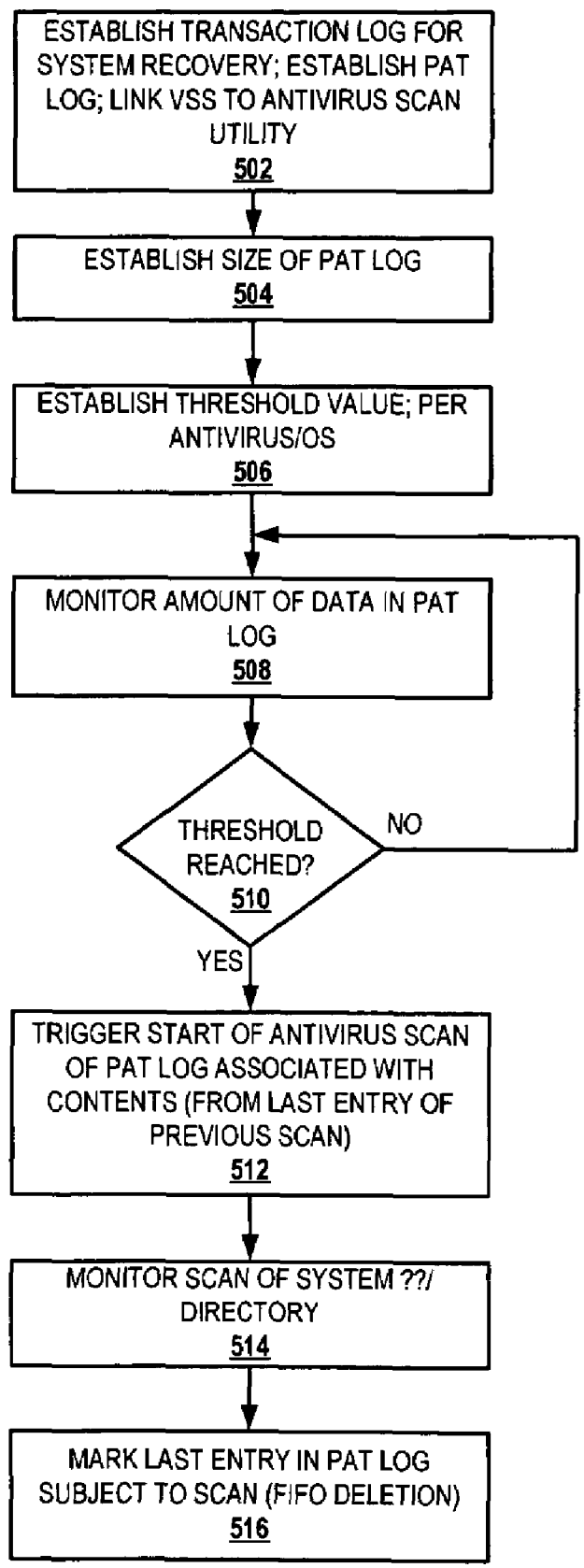
FIG. 5 is a flow chart of the process by which VSS utility establishes and maintains the PAT log for use by the antivirus scanning utility according to one embodiment of the invention.

Referring now to FIG. 5, there is illustrated a flow chart of the processing that occurs within the JFS and specifically the VSS utility and PAT log. The process begins at block 502 at which the JFS establishes the various transaction logs, including the persistent PAT log. JFS establishes a preset size of the PAT log at block 504. This value is important in determining the amount of data (objects) that can be logged before the antivirus scan is triggered, and is thus a design parameter that enables most efficient use of the PAT log with a particular antivirus scanning utility. Once the overall size of the PAT log is set, JFS then establishes a threshold value, less than the overall size, as indicated at block 506. The threshold value represents that value at which JFS will send a trigger to initiate the antivirus utility to begin a scan of the system using the data gathered within the PAT log. The threshold value selected enables the JFS to continue recording transactions/operations occurring while the antivirus scanning utility completes a scan based on the previously logged contents of the PAT log.

The VSS monitors the amount of data recorded within the PAT log from the previous scan, a shown at block 508, and VSS makes a determination at block 510 whether the threshold point has been reached. When the threshold has been reached, the VSS triggers a start of a virus scan by the antivirus scanning utility, as described within block 512. JFS then resumes monitoring the system for new transactions/operations affecting data, files, directories, as indicated at block 514, and the point at which these new operations are logged is marked by the VSS, as shown at block 516.

Several different approaches may be implemented when handling those entries within the PAT log that have been replayed by a previous virus scan. In a first embodiment, VSS discards all entries in the PAT log that have already been considered in a prior virus scan when the virus scan is completed. The PAT log is thus able to record a new set of transactions/operations occurring during and subsequent to that virus scan. In another embodiment, a new PAT log may be created by JFS and the previous PAT log deleted once the antivirus scan utility completes a antivirus scan that considers all the contents of the previous PAT log. With the embodiment involving a FIFO log, once an antivirus scan is completed, the JFS marks the last entry in the transaction log that was considered (replayed) by the last scan. Then a subsequent scan is only concerned with transactions occurring from that point within the PAT log, and the JFS directs the next virus scan by the antivirus scanning utility to those relevant transactions.

While an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a method comprising:
    logging, in a persistent storage log, a record of all transactions/operations affecting any files, data or directories on the data processing system, said transactions/operations occurring subsequent to the start of a previous scan of the data processing system for malicious software and associated malicious activity, wherein said persistent storage log is a first-in first-out buffer with a pre-established size for holding a preset amount of data;
    establishing a threshold amount of data that may be stored between a previous and subsequent scan; and
    when said threshold amount is reached prior to an automatic trigger of the subsequent scan, triggering the subsequent scan on the files, data and directories affected by the operations; and
    subsequent to the initiation of the current scan, marking a location within the persistent storage log representing a first entry logged within the persistent storage;
    performing each subsequent scan on only the files, data and directories affected by those transactions/operations occurring subsequent to the start of the previous scan, said files, data and directories being identified using entries of the transactions/operations recorded within the persistent storage log;
    establishing a threshold amount of data to collect in the persistent storage log between sequentially completed scans, said threshold amount being an amount less than a full amount supported by the persistent storage log and less than an amount at which new entries will cause overflow of the persistent storage log before the previously stored entries are retrieved for scanning of corresponding files, data and directories;
    enabling only an administrative user with driver level access to access the persistent storage log, such that malicious software that changes a file's timestamp to hide malicious activity is unable to affect the persistent storage log;
    performing an initial scan of the entire data processing system to remove any malicious software from the data processing system; and enabling user override of the subsequent scan on only selected components that correspond to entries within the persistent storage log, such that a full scan of the entire data processing system may be completed during the subsequent scan when a full scan option is selected by a user;
    wherein the persistent storage log is one of multiple journal logs, including a primary log, of a journal file system (JFS) associated with the operating system (OS) of the data processing system, said persistent storage log being updated via the JFS and being immune from JFS purge operations following completion of a system reset condition, wherein when the primary log is about to be purged, the entries of the primary log are copied to the persistent storage log and remain within the persistent storage log until subjected to a subsequent virus scan;
    enabling a purge of specific contents of the persistent storage log following a successful scan operation, wherein the contents that are replayed during the scan operation are purged from the persistent storage log and new contents logged subsequent to a start of the scan operation are maintained in a persistent state until replayed by a subsequent scan operation;
    establishing a new persistent log for recording operations that occur from a start of the previous scan; and
    deleting a previous persistent log once the entries of the previous persistent log have all been addressed by the previous scan.

2. A computer program product comprising:
    a computer readable storage medium; and
    program code on said computer readable storage medium for:
    logging, in a persistent storage log, a record of all transactions/operations affecting any files, data or directories on the data processing system, said transactions/operations occurring subsequent to the start of a previous scan of the data processing system for malicious software and associated malicious activity, wherein said persistent storage log is a first-in first-out buffer with a pre-established size for holding a preset amount of data;
    establishing a threshold amount of data that may be stored between a previous and subsequent scan; and
    when said threshold amount is reached prior to an automatic trigger of the subsequent scan, triggering the subsequent scan on the files, data and directories affected by the operations; and
    subsequent to the initiation of the current scan, marking a location within the persistent storage log representing a first entry logged within the persistent storage;
    performing each subsequent scan on only the files, data and directories affected by those transactions/operations occurring subsequent to the start of the previous scan, said files, data and directories being identified using entries of the transactions/operations recorded within the persistent storage log;
    establishing a threshold amount of data to collect in the persistent storage log between sequentially completed scans, said threshold amount being an amount less than a full amount supported by the persistent storage log and less than an amount at which new entries will cause overflow of the persistent storage log before the previously stored entries are retrieved for scanning of corresponding files, data and directories;
    enabling only an administrative user with driver level access to access the persistent storage log, such that malicious software that changes a file's timestamp to hide malicious activity is unable to affect the persistent storage log;
    performing an initial scan of the entire data processing system to remove any malicious software from the data processing system; and enabling user override of the subsequent scan on only selected components that correspond to entries within the persistent storage log, such that a full scan of the entire data processing system may be completed during the subsequent scan when a full scan option is selected by a user;
    wherein the persistent storage log is one of multiple journal logs, including a primary log, of a journal file system (JFS) associated with the operating system (OS) of the data processing system, said persistent storage log being updated via the JFS and being immune from JFS purge operations following completion of a system reset condition, wherein when the primary log is about to be purged, the entries of the primary log are copied to the persistent storage log and remain within the persistent storage log until subjected to a subsequent virus scan;
    enabling a purge of specific contents of the persistent storage log following a successful scan operation, wherein the contents that are replayed during the scan operation are purged from the persistent storage log and new contents logged subsequent to a start of the scan operation are maintained in a persistent state until replayed by a subsequent scan operation;

establishing a new persistent log for recording operations that occur from a start of the previous scan; and deleting a previous persistent log once the entries of the previous persistent log have all been addressed by the previous scan.

3. A data processing system comprising:

a processor;

a memory coupled to the processor;

an operating system (OS) with associated journal file system (JFS) that maintains a plurality of journal logs, including a primary log and a persistent log;

program means for reducing a time required to perform a scan and clean operation for detecting and removing malicious components on the data processing system, said program means including code that executes on the processor to provide functions of:

logging, in a persistent storage log, a record of all transactions/operations affecting any files, data or directories on the data processing system, said transactions/operations occurring subsequent to the start of a previous scan of the data processing system for malicious software and associated malicious activity, wherein said persistent storage log is a first-in first-out buffer with a pre-established size for holding a preset amount of data;

establishing a threshold amount of data that may be stored between a previous and subsequent scan; and when said threshold amount is reached prior to an automatic trigger of the subsequent scan, triggering the subsequent scan on the files, data and directories affected by the operations; and subsequent to the initiation of the current scan, marking a location within the persistent storage log representing a first entry logged within the persistent storage;

performing each subsequent scan on only the files, data and directories affected by those transactions/operations occurring subsequent to the start of the previous scan, said files, data and directories being identified using entries of the transactions/operations recorded within the persistent storage log;

establishing a threshold amount of data to collect in the persistent storage log between sequentially completed scans, said threshold amount being an amount less than a full amount supported by the persistent storage log and less than an amount at which new entries will cause overflow of the persistent storage log before the previously stored entries are retrieved for scanning of corresponding files, data and directories;

enabling only an administrative user with driver level access to access the persistent storage log, such that malicious software that changes a file's timestamp to hide malicious activity is unable to affect the persistent storage log;

performing an initial scan of the entire data processing system to remove any malicious software from the data processing system; and enabling user override of the subsequent scan on only selected components that correspond to entries within the persistent storage log, such that a full scan of the entire data processing system may be completed during the subsequent scan when a full scan option is selected by a user;

wherein the persistent storage log is one of multiple journal logs, including a primary log, of a journal file system (JFS) associated with the operating system (OS) of the data processing system, said persistent storage log being updated via the JFS and being immune from JFS purge operations following completion of a system reset condition, wherein when the primary log is about to be purged, the entries of the primary log are copied to the persistent storage log and remain within the persistent storage log until subjected to a subsequent virus scan;

enabling a purge of specific contents of the persistent storage log following a successful scan operation, wherein the contents that are replayed during the scan operation are purged from the persistent storage log and new contents logged subsequent to a start of the scan operation are maintained in a persistent state until replayed by a subsequent scan operation;

establishing a new persistent log for recording operations that occur from a start of the previous scan; and deleting a previous persistent log once the entries of the previous persistent log have all been addressed by the previous scan.

* * * * *